United States Patent
Park et al.

(10) Patent No.: US 9,780,568 B2
(45) Date of Patent: Oct. 3, 2017

(54) WIRELESS POWER RECEIVER AND METHOD FOR CONTROLLING THE SAME

(75) Inventors: Sung-Kweon Park, Gyeonggi-do (KR); Ki-Hyun Kim, Gyeonggi-do (KR); Kil-Soo Ko, Gyeonggi-do (KR); Se-Ho Park, Gyeonggi-do (KR); Jin-Hyoung Park, Gangwon-do (KR)

(73) Assignee: Samsung Electronics Co., Ltd (KR)

( * ) Notice: Subject to any disclaimer, the term of this patent is extended or adjusted under 35 U.S.C. 154(b) by 859 days.

(21) Appl. No.: 13/473,192

(22) Filed: May 16, 2012

(65) Prior Publication Data

US 2012/0293008 A1    Nov. 22, 2012

(30) Foreign Application Priority Data

May 17, 2011  (KR) .......................... 10-2011-0046352
Mar. 29, 2012  (KR) .......................... 10-2012-0032364

(51) Int. Cl.
    *H02J 17/00*   (2006.01)
    *H02J 5/00*    (2016.01)
    *H02M 1/14*    (2006.01)
    *H02J 50/10*   (2016.01)
    *H02J 7/02*    (2016.01)

(52) U.S. Cl.
    CPC .............. *H02J 5/005* (2013.01); *H02J 50/10* (2016.02); *H02M 1/14* (2013.01); *H02J 7/025* (2013.01)

(58) Field of Classification Search
    CPC ........ H02J 1/10; H02J 5/00; H02J 7/00; H02J 17/00; H02J 3/38; H02M 3/158
    USPC ....................................................... 307/104
    See application file for complete search history.

(56) References Cited

U.S. PATENT DOCUMENTS

| | | | | |
|---|---|---|---|---|
| 3,943,446 A | * | 3/1976 | Quidort .................... | H03C 3/00 307/60 |
| 4,577,144 A | * | 3/1986 | Hodgman ............... | H02J 7/027 320/106 |
| 5,132,606 A | | 7/1992 | Herbert | |

(Continued)

FOREIGN PATENT DOCUMENTS

| | | |
|---|---|---|
| CN | 101965671 | 2/2011 |
| KR | 1020050063453 | 6/2005 |

OTHER PUBLICATIONS

Klaus Finkenzeller, RFID Handbook: Fundamentals and Applications in Contactless Smart Cards and Identification, Second Edition, 2003 Chapter 3 (p. 44-56) & 6 (p. 1-4).*

(Continued)

*Primary Examiner* — Rexford Barnie
*Assistant Examiner* — Elim Ortiz
(74) *Attorney, Agent, or Firm* — The Farrell Law Firm, P.C.

(57) ABSTRACT

A wireless power receiver that receives wireless power from a wireless power transmitter and a control method thereof are provided, wherein the wireless power receiver receives the wireless power from the wireless power transmitter; rectifies the wireless power; monitoring a voltage value of the rectified wireless power; determines whether a ripple of the voltage value of the wireless power is greater than or equal to a preset threshold; and if the ripple of the voltage value of the wireless power is greater than or equal to the preset threshold, changes at least one element value of the wireless power receiver to suppress the ripple below the preset threshold.

12 Claims, 5 Drawing Sheets

(56) References Cited

U.S. PATENT DOCUMENTS

| | | | | |
|---|---|---|---|---|
| 5,260,701 | A * | 11/1993 | Guern | A61N 1/37223 340/10.34 |
| 5,398,182 | A * | 3/1995 | Crosby | G05F 1/66 307/71 |
| 5,414,614 | A * | 5/1995 | Fette | H02M 3/07 363/59 |
| 5,721,535 | A | 2/1998 | Ikefuji | |
| 5,828,703 | A * | 10/1998 | Kanda | G06K 19/0723 375/316 |
| 6,122,492 | A * | 9/2000 | Sears | G06K 7/0008 330/124 R |
| 6,134,130 | A * | 10/2000 | Connell | G06K 19/0701 363/70 |
| 6,281,668 | B1 * | 8/2001 | Sudo | H02M 3/156 323/299 |
| 6,433,502 | B2 * | 8/2002 | Oku | 318/400.33 |
| 6,775,323 | B1 * | 8/2004 | Vasudevan Pillai | G01S 13/751 340/10.4 |
| 6,970,690 | B2 * | 11/2005 | Yajima | G06F 1/26 455/343.1 |
| 8,111,140 | B2 * | 2/2012 | Rizzo | G06K 19/0723 340/10.1 |
| 8,258,955 | B1 * | 9/2012 | Hyde | H04B 5/0062 340/12.51 |
| 2001/0054874 | A1 | 12/2001 | Oku | |
| 2002/0000916 | A1 * | 1/2002 | Richards | G01S 5/0036 340/572.1 |
| 2002/0022454 | A1 * | 2/2002 | Serra | H04B 5/0012 455/41.1 |
| 2002/0033691 | A1 | 3/2002 | Rolfes | |
| 2004/0227619 | A1 * | 11/2004 | Watanabe | G06K 19/0723 340/10.34 |
| 2007/0145830 | A1 * | 6/2007 | Lee | H02J 5/005 307/135 |
| 2009/0079387 | A1 * | 3/2009 | Jin | H02J 7/0004 320/108 |
| 2009/0174263 | A1 | 7/2009 | Baarman et al. | |
| 2010/0019749 | A1 | 1/2010 | Katsuya et al. | |
| 2010/0045446 | A1 * | 2/2010 | Hyun | H04B 13/005 340/10.51 |
| 2010/0084918 | A1 * | 4/2010 | Fells | H02J 5/005 307/32 |
| 2011/0029790 | A1 | 2/2011 | Maniktala | |
| 2011/0235800 | A1 * | 9/2011 | Furukawa | H04B 5/0037 380/33 |
| 2012/0250383 | A1 * | 10/2012 | Song | G05F 1/613 363/126 |
| 2012/0293008 | A1 * | 11/2012 | Park | H02M 1/14 307/104 |
| 2013/0063083 | A1 * | 3/2013 | Park | H02J 7/0013 320/108 |
| 2013/0099588 | A1 * | 4/2013 | Yeo | H02J 5/005 307/104 |
| 2013/0147279 | A1 * | 6/2013 | Muratov | H02J 5/005 307/104 |
| 2013/0334896 | A1 * | 12/2013 | Yamamoto | B60L 11/182 307/104 |

OTHER PUBLICATIONS

European Search Report dated Aug. 11, 2015 issued in counterpart application No. 12162590.9-1806, 8 pages.
Chinese Office Action dated May 12, 2015 issued in counterpart application No. 201210150251.9.
Chinese Office Action dated Feb. 4, 2016 issued in counterpart application No. 201210150251.9, 15 pages.

* cited by examiner

WIRELESS POWER RECEIVER AND METHOD FOR CONTROLLING THE SAME

PRIORITY

This application claims priority under 35 U.S.C. §119(a) to Korean Patent Application Serial No. 10-2011-0046352, which was filed in the Korean Intellectual Property Office on May 17, 2011, and to Korean Patent Application Serial No. 10-2012-0032364, which was filed in the Korean Intellectual Property Office on Mar. 29, 2012, the entire disclosure of each of which is hereby incorporated by reference.

BACKGROUND OF THE INVENTION

1. Field of the Invention

The present invention relates generally to a wireless power receiver and a method for controlling the same, and more particularly, to a wireless power receiver for suppressing ripple caused by load modulation and a method for controlling the same.

2. Description of the Related Art

Mobile terminals, such as mobile phones and Personal Digital Assistants (PDAs), are powered by a rechargeable battery.

Recently, wireless or contactless charging technologies have been developed and used to charge these rechargeable batteries. By using these wireless charging technologies, which use wireless power transmission/reception, a battery may be charged by merely placing a device, for example, a mobile phone, on a charging pad without connecting it to a separate charging connector.

These wireless charging technologies may be roughly classified into a coil-based electromagnetic induction scheme, a resonance scheme, and a Radio Frequency (RF)/microwave radiation scheme that transforms electric energy into microwaves and transmits the microwaves.

An electromagnetic induction-based power transmission method transmits power between a primary coil and a secondary coil. Specifically, an induced current is generated as a magnet moves around a coil, or vice versa. Based on this, a transmitter generates a magnetic field, and a receiver produces energy as a current is induced depending on changes in magnetic field. This phenomenon is referred to as magnetic induction, and a magnetic induction-based power transmission method has excellent energy transfer efficiency.

As to the resonance scheme, electricity is delivered wirelessly to electronic products that are several meters away from the charging device. The resonance scheme uses a resonance concept of physics that, if a tuning fork rings or resonates, a nearby wine glass may also ring at the same frequency. The resonance scheme causes electromagnetic waves containing electric energy to resonate, instead of the sound to resonate. However, the resonant electrical energy may be directly transferred only when there are devices having a resonant frequency.

A conventional wireless power receiver utilizes a load modulation scheme for communication with a wireless power transmitter. However, a ripple often occurs in an output voltage due to load modulation performed in the conventional wireless power receiver. The conventional wireless power receiver may include a regulator to reduce the ripple, but the total efficiency may be undesirably reduced by adding the regulator to wireless power receiver.

SUMMARY OF THE INVENTION

The present inventory has been designed to address at least the above-mentioned problems and/or disadvantages, and to provide at least the advantages described below.

An aspect of the present invention is to provide a wireless power receiver capable of suppressing an output voltage ripple without adding additional elements, such as a regulator, to the receiver, and a method for controlling the same.

In accordance with an aspect of the present invention, a control method is provided for a wireless power receiver that receives wireless power from a wireless power transmitter. The control method includes receiving the wireless power from the wireless power transmitter; rectifying the wireless power; monitoring a voltage value of the rectified wireless power; determining whether a ripple of the voltage value of the rectified wireless power is greater than or equal to a preset threshold; and if the ripple of the voltage value of the wireless power is greater than or equal to the preset threshold, changing at least one element value of the wireless power receiver to suppress the ripple below the preset threshold.

In accordance with another aspect of the present invention, a wireless power receiver is provided for receiving wireless power from a wireless power transmitter. The wireless power receiver includes a power receiver for receiving the wireless power from the wireless power transmitter; a rectifier for rectifying the wireless power; a controller for monitoring a voltage value of the rectified wireless power, determining whether a ripple of the voltage value of the rectified wireless power is greater than or equal to a preset threshold, and if the ripple of the voltage value of the wireless power is greater than or equal to a preset threshold, changing at least one element value of the wireless power receiver to suppress the ripple below the preset threshold; and a charger for charging the rectified wireless power.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
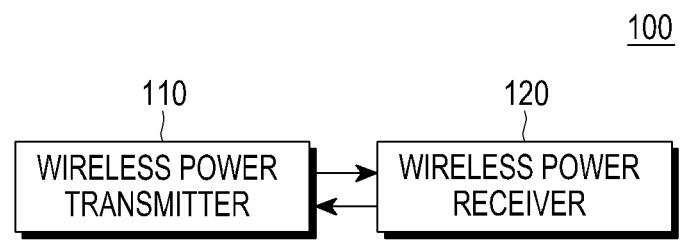
FIG. 1 is a block diagram illustrating a wireless power transmission/reception system according to an embodiment of the present invention.

FIG. 1 is a block diagram illustrating a wireless power transmission/reception system according to an embodiment of the present invention.

Referring to FIG. 1, the wireless power transmission/reception system includes a wireless power transmitter 110 and a wireless power receiver 120. The wireless power transmitter 110 makes an electrical connection to the wireless power receiver 120. For example, the wireless power transmitter 110 supplies wireless power to the wireless power receiver 120 in the form of electromagnetic waves.

The wireless power transmitter 110 performs two-way communication with the wireless power receiver 120. For example, the wireless power transmitter 110 and the wireless power receiver 120 may be devices that process and transmit/receive communication packets, mobile phones, PDAs, Personal Multimedia Players (PMPs), smart phones, etc.

The wireless power transmitter 110 wirelessly supplies power to the wireless power receiver 120. Additionally, the wireless power transmitter 110 may transmit wireless power to a plurality of wireless power receivers.

When the wireless power transmitter 110 utilizes the resonance scheme, the distance between the wireless power transmitter 110 and the wireless power receiver 120 is preferably 30 m or less. When the wireless power transmitter 110 utilizes the electromagnetic induction scheme, the distance between the wireless power transmitter 110 and the wireless power receiver 120 is preferably 10 cm or less.

The wireless power receiver 120 may transmit information related to the wireless power receiver 120 to the wireless power transmitter 110. The information related to the wireless power receiver 120 may include charge status information, location information, identification information, battery capacity information, battery level information, etc., of the wireless power receiver 120.

Based on the related information, the wireless power transmitter 110 may transmit a control signal for enabling/disabling a wireless charging function, to the wireless power receiver 120. Upon receiving the control signal for enabling/disabling the wireless charging function from the wireless power transmitter 110, the wireless power receiver 120 enable/disables the wireless charging function accordingly.

The wireless power receiver 120 may transmit the above-described information to the wireless power transmitter 110 using a load modulation scheme. For example, the wireless power receiver 120 may include a switch for performing load modulation. The switch may include a load switch, a free-wheeling switch, an N-channel Metal-Oxide-Semiconductor (N-MOS) switch, a P-channel Metal-Oxide-Semiconductor (P-MOS) switch, etc.

However, as described above, the wireless power receiver 120 may suffer from a ripple in output voltage as a result of performing load modulation. Specifically, the ripple occurs due to changes in impedance in the process of performing load modulation.

In accordance with an embodiment of the present invention, the wireless power receiver 120 suppresses the generated ripple.

Figure 2:
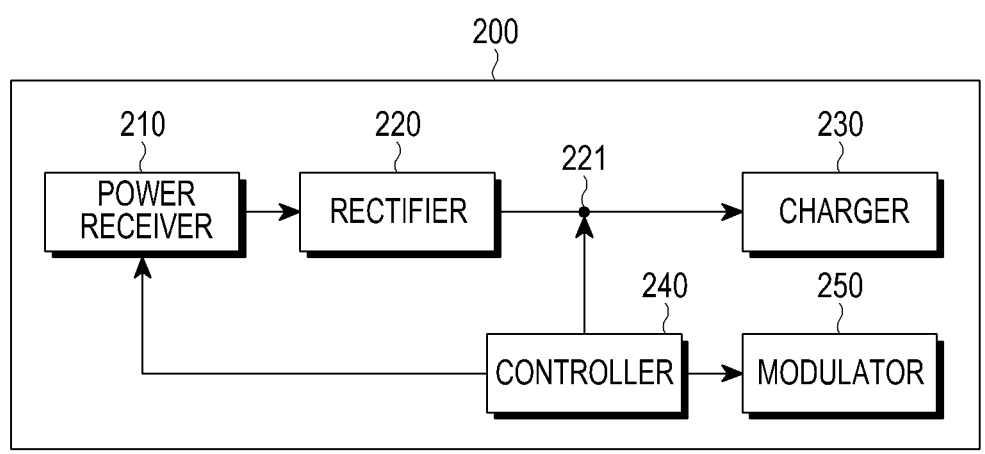
FIG. 2 is a block diagram illustrating a wireless power receiver according to an embodiment of the present invention.

FIG. 2 is a block diagram illustrating a wireless power receiver according to an embodiment of the present invention.

Referring to FIG. 2, a wireless power receiver 120 includes a power receiver 210, a rectifier 220, a charger 230, a controller 240, a modulator 250, and a storage 250.

The power receiver 210 receives wireless power supplied from a wireless power supplier. In accordance with an embodiment of the present invention, the wireless power receiver 120 may receive wireless power from the wireless power supplier based on the resonance scheme, and thus may be realized with a loop coil having a specific inductance.

The power receiver 210 receives wireless power when the power receiver 210 resonates at an electromagnetic field output from the wireless power supplier. When the power receiver 210 includes a loop coil, an inductance L of the loop coil is subject to change, thus making it possible to provide a structure that receives electromagnetic waves (i.e., wireless power) of various frequencies. It will be understood by those of ordinary skill in the art that a plurality of loop coils may be used, and other devices capable of receiving wireless power by resonating at a frequency of electromagnetic waves may be used without restriction.

The power receiver 210 is connected to the rectifier 220, and outputs the received wireless power to the rectifier 220. The received wireless power may have a specific voltage value output from the wireless power supplier, and the voltage value may be greater than or equal to a voltage value used by the wireless power receiver 120. In addition, the wireless power may be in the form of Alternating Current (AC).

The rectifier 220 rectifies the input wireless AC power and outputs the rectified wireless power in the form of Direct Current (DC). It will be understood by those of ordinary skill in the art that the rectifier 220 may be, e.g., a diode, or other device capable of rectifying wireless power.

The charger 230 is a device uses or stores power. For example, the charger 230 is a battery or the like, when the wireless power receiver 120 is a mobile phone or a smart phone.

The controller 240 controls the overall operation of the wireless power receiver 120. The controller 240 reads programs, applications, or algorithms stored in a storage (not shown) for operation of the wireless power receiver 120. Accordingly, the controller 240 generates control signals for controlling the overall operation of the wireless power receiver 120.

Accordingly, the controller 240 monitors a voltage applied to an output terminal 221 of the rectifier 220, i.e., the controller 240 monitors a voltage of the rectified wireless power. Specifically, the controller 240 monitors a ripple of the rectified wireless power and determines whether the ripple is greater than or equal to a preset threshold.

For example, the controller 240 receives part of the rectified wireless power from the output terminal 221 of the rectifier 220, and generates time-series voltage value data by Analog-to-Digital Converting (ADC) the part of the rectified wireless power. The controller 240 calculates a difference between the time-series voltage value data, and determines the difference as an absolute value of the ripple.

The controller 240 determines whether the absolute value of the ripple is greater than or equal to a preset threshold. The controller 240 may include an element such as a comparator. The comparator receives the preset threshold as a reference value, and receives the calculated difference as a comparison value. Based on the comparison results therebetween, the comparator determines whether the absolute value of the ripple is greater than or equal to the preset threshold.

If the absolute value of the ripple is less than the preset threshold, the controller 240 does not output an additional control signal. However, if the absolute value of the ripple is greater than or equal to the preset threshold, the controller 240 may generates a control signal for changing an element value of the power receiver 210 or the modulator 250.

Additionally, it will be understood by those of ordinary skill in the art that the structure, in which the controller 240 monitors a voltage on the output terminal 221 of the rectifier 220 and compares it with a threshold, may be modified.

The modulator 250 includes a switch. The modulator 250 turns on/off the switch under control of the controller 240. As the modulator 250 turns on/off the switch, the impedance seen from the wireless power supplier may be changed. The wireless power supplier may receive related information from the wireless power receiver 120 depending on the changes in impedance.

The modulator 250 performs signal modulation based on a resistive load modulation scheme or a capacitive load modulation scheme. The modulator 250 may be designed in various different circuit patterns depending on its modulation scheme.

The controller 240, as described above, generates control signals for changing at least one element value among the power receiver 210 and the modulator 250. The controller 240 may change at least one element value that at least one of the power receiver 210 and the modulator 250 has. The change in at least one element value is intended to reduce the absolute value of a detected ripple.

The controller 240 may continuously change the element value while monitoring the absolute value of the ripple in real time. Accordingly, the controller 240 may generate element value changing control signals until the absolute value of the ripple is less than a preset threshold.

The controller 240 may read a look-up table between the ripple and the target element value, which is stored in the storage 260, and output an element value changing control signal. The storage may store look-up table for a relationship between an absolute value of a proper ripple and a change in element value, which corresponds to a difference between an absolute value of the ripple and an absolute value of a proper ripple. A proper ripple is a ripple, which is available for controlling the wireless power receiver 120. For example, a value of the proper ripple may be under 100 mV.

As described above, the wireless power receiver 120 suppresses the ripple of the rectified wireless power without using a regulator.

Figure 3A:
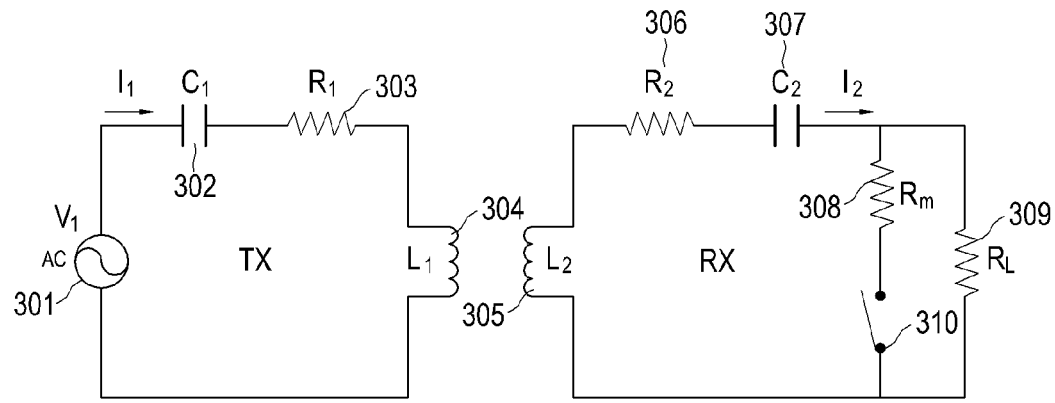
FIGS. 3A and 3B are circuit diagrams illustrating different load modulation schemes according to an embodiment of the present invention.
Figure 3B:
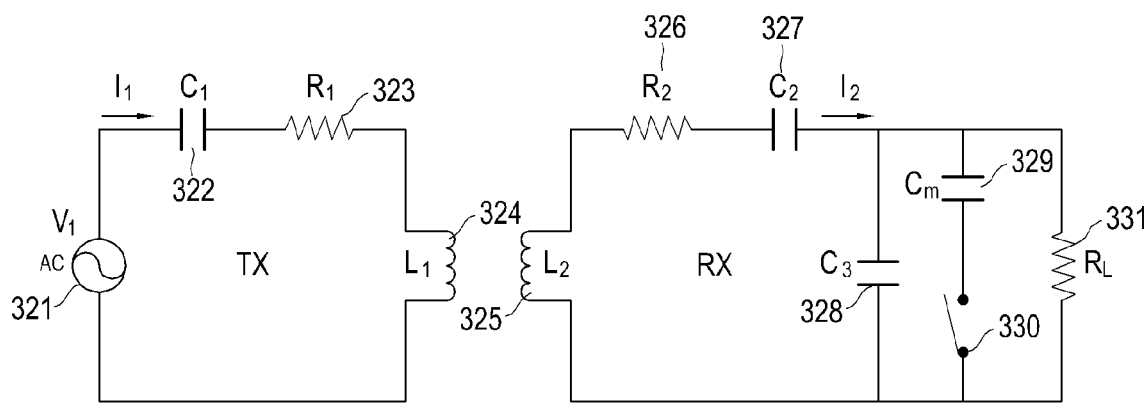

FIGS. 3A and 3B are circuit diagrams illustrating different load modulation schemes according to an embodiment of the present invention.

Specifically, FIG. 3A is a circuit diagram illustrating a resistive load modulation scheme according to an embodiment of the present invention.

Referring to FIG. 3A, a wireless power transmitter (TX) includes a power supplier 301, a capacitor 302, a resistor 303, and a coil 304. A wireless power receiver (RX) includes a coil 305, a resistor 306, a capacitor 307, a resistor 308, a resistor 309, and a switch 310. It will be understood by those of ordinary skill in the art that the wireless power receiver in FIG. 3A illustrates only a power receiver and a modulator, and other components are omitted for simplicity.

The power supplier 301 supplies AC power having a preset voltage level of $V_1$ and a specific current level of $I_1$. The power supplier 301 is connected to the capacitor 302, which has a capacitance of C1. The other end of the capacitor 302 is connected to the resistor 303, which has a resistance of R1. The other end of the resistor 303 is connected to the coil 304, which has an inductance of L1. The other end of the coil 304 then connects back to the power supplier 301.

The wireless power is oscillated (or generated) in the coil 304 and received in coil 305, which has an inductance of L2. The coil 305 is connected to the resistor 306, which has a resistance of R2. The other end of the resistor 306 is connected to the capacitor 307, which has a capacitance of C2. The other end of the capacitor 307 is connected to the resistor 308 and the resistor 309. The resistor 308 has a resistance of Rm, and the resistor 309 has a resistance of RL. The other end of the resistor 308, and the other end of the resistor 309 are respectively connected to opposite ends of the switch 310, and the coil 305.

Circuit analysis in the wireless power transmitter illustrated in FIG. 3A may be expressed as shown in Equation (1).

$$V_1 = \left(R_1 + j\omega L_1 + \frac{1}{j\omega C_1}\right)I_1 - j\omega M I_2 \quad (1)$$

In Equation (1), ω represents an angular frequency of AC power, and M represents a mutual inductance between the coil 304 and the coil 305.

Circuit analysis in the wireless power receiver illustrated in FIG. 3A may be expressed as shown in Equation (2).

$$0 = -j\omega M I_1 + \left(R_2 + j\omega L_2 + \frac{1}{j\omega C_2} + \frac{R_L R_m}{R_L + R_m}\right)I_2 \quad (2)$$

$$R_1 + j\omega L_1 + \frac{1}{j\omega C_1}$$

in Equation (1) may be represented as $Z_{11}$, and $$R_2 + j\omega L_2 + \frac{1}{j\omega C_2} + \frac{R_L R_m}{R_L + R_m}$$

in Equation (2) may be represented as $Z_{22}$.

In summary of Equation (1) and Equation (2), a voltage applied to one end of the power supplier 301 may be summarized as shown in Equation (3).

$$V_1 = \left(Z_{11} + \frac{\omega^2 M^2}{Z_{22}}\right)I_1 = (Z_{11} + Z_r)I_1 \quad (3)$$

$Z_r$ in Equation (3) may be $$\frac{\omega^2 M^2}{Z_{22}}.$$

Further, in summary of Equation (1) and Equation (2), a current applied to the wireless power receiver may be summarized as shown in Equation (4).

$$I_2 = \left(\frac{j\omega M}{Z_{11}Z_{22} + \omega^2 M^2}\right)V_1 \quad (4)$$

As shown in Equation (4), the current of the power applied to the wireless power receiver is affected by $Z_{22}$, causing a change in current during load modulation and thus generating a ripple.

Accordingly, a level of the ripple may be changed by changing at least one element value in $Z_{22}$. For example, a control signal for suppressing a level of the ripple may be a control signal for increasing a resistance of Rm.

FIG. 3B is a circuit diagram illustrating a capacitive load modulation scheme according to an embodiment of the present invention.

Referring to FIG. 3B, a wireless power transmitter may include a power supplier 321, a capacitor 322, a resistor 323, and a coil 324. A wireless power receiver (RX) includes a coil 325, a resistor 326, a capacitor 327, a capacitor 328, a capacitor 329, a switch 330, and a resistor 331. It will be understood by those of ordinary skill in the art that the wireless power receiver in FIG. 3B illustrates only a power receiver and a modulator, and other components are omitted for simplicity.

The power supplier 321 and supplies AC power having a preset voltage level of V1 and a specific current level of I1. The power supplier 321 is connected to the capacitor 322, which has a capacitance of C1. The other end of the capacitor 322 is connected to the resistor 323, which has a resistance of R1. The other end of the resistor 323 is connected to one end of the coil 324, which has an inductance of L1. The other end of the coil 324 is connected back to the power supplier 321.

The wireless power is oscillated (or generated) in the coil 324 and received by coil 325. The coil 325 has an inductance of L2, and is connected to the resistor 326, which has a resistance of R2. The other end of the resistor 326 is connected to the capacitor 327, which has a capacitance of C2. The other end of the capacitor 327 is connected to the capacitor 328 and the capacitor 329, which have capacitances of C3 and Cm, respectively. In addition, the capacitor 327 is connected to the resistor 331, which has a resistance of RL. The capacitor 329 is connected to the switch 330. The other ends of the capacitor 328, the switch 330, and the resistor 331 are connected back to the coil 325.

Circuit analysis in the wireless power transmitter illustrated in FIG. 3B may also be expressed as shown above in Equation (1).

Circuit analysis in the wireless power receiver illustrated in FIG. 3B may be expressed as shown in Equation (5).

$$0 = -j\omega MI_1 + \left(R_2 + j\omega L_2 + \frac{1}{j\omega C_2} + \left(\frac{1}{j\omega(C_3 + C_m)}\|R_L\right)\right)I_2 \quad (5)$$

$$R_2 + j\omega L_2 + \frac{1}{j\omega C_2} + \left(\frac{1}{j\omega(C_3 + C_m)}\|R_L\right)$$

in Equation (5) may be represented as $Z_{33}$.

In summary of Equation (1) and Equation (5), a voltage applied to one end of the power supplier 321 may be summarized as shown in Equation (6).

$$V_1 = \left(Z_{11} + \frac{\omega^2 M^2}{Z_{33}}\right)I_1 = (Z_{11} + Z_r)I_1 \quad (6)$$

Zr in Equation (6) may be $$\frac{\omega^2 M^2}{Z_{33}}.$$

Further, in summary of Equation (1) and Equation (5), a current applied to the wireless power receiver may be summarized as Equation (7).

$$I_2 = \left(\frac{j\omega M}{Z_{11}Z_{33} + \omega^2 M^2}\right)V_1 \quad (7)$$

As shown in Equation (7), the current of the power applied to the wireless power receiver is affected by $Z_{33}$, causing a change in current during load modulation and thus generating a ripple.

Accordingly, a level of the ripple may be changed by changing at least one element value in $Z_{33}$. For example, a control signal for suppressing a level of the ripple may be a control signal for increasing a capacitance of Cm.

Figure 4:
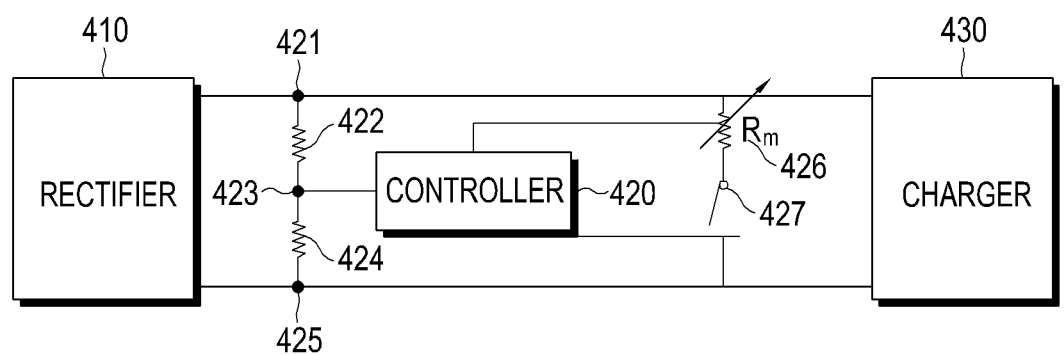
FIG. 4 illustrates a modulator according to an embodiment of the present invention.

FIG. 4 illustrates a modulator according to an embodiment of the present invention.

Referring to FIG. 4, the modulator is connected to a rectifier 410, a controller 420, and a charger 430. The modulator illustrated in FIG. 4 performs modulation based on a resistive load modulation scheme. The modulator includes a resistor 422, a resistor 424, a variable resistor 426, and a switch 427. The rectifier 410 is connected to a node 421, which is connected to the resistor 422, the variable resistor 426, and the charger 430.

The other end of the resistor 422 is connected to a node 423, which is connected to the controller 420 and the resistor 424. The other end of the resistor 424 is connected to a node 425, which is connected to the rectifier 410, the switch 427, and the charger 430.

The other end of the variable resistor 426 is connected to the controller 420 and the switch 427. The variable resistor 426 has a resistance Rm, a value of which is variable. For example, the variable resistor 426 changes its resistance based on the element value changing control signal received from the controller 420.

If an absolute value of the ripple is greater than or equal to a threshold, the controller 420 changes the resistance of the variable resistor 426. Based on the change in resistance, the absolute value of the ripple may be suppressed below the threshold.

The switch 427 may include an N-MOS element. In this case, a gate of the N-MOS element is connected to the controller 420 to receive a modulation signal.

Suppressing an absolute value of the ripple below a threshold by changing a resistance of the variable resistor 426 in conjunction with FIG. 4 is merely one example. A structure of suppressing an absolute value of the ripple below a threshold by changing a capacitance of a variable capacitor may also be easily understood by those of ordinary skill in the art.

Figure 5:
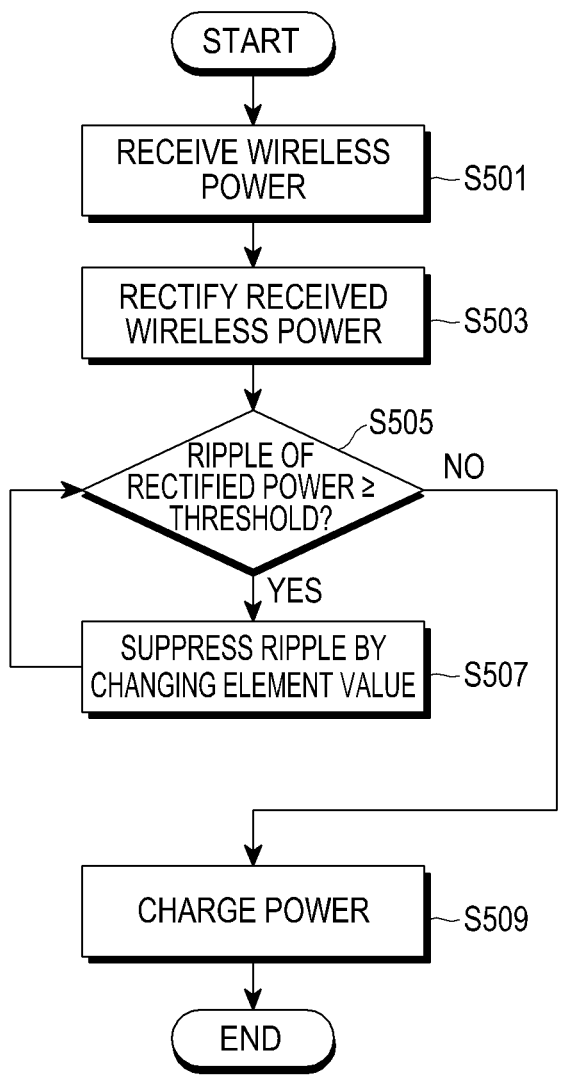
FIG. 5 is a flowchart illustrating a control method in a wireless power receiver according to an embodiment of the present invention.

FIG. 5 is a flowchart illustrating a control method in a wireless power receiver according to an embodiment of the present invention.

Referring to FIG. 5, the wireless power receiver receives wireless power from a wireless power transmitter in step S501.

The wireless power receiver rectifies the received wireless power and outputs the rectified DC wireless power in step S503.

In step S505, the wireless power receiver determines whether an absolute value of a ripple of the rectified wireless power is greater than or equal to a preset threshold. If the absolute value of the ripple is greater than or equal to the preset threshold, the wireless power receiver changes an element value in step S507 so that the absolute value of the ripple may be suppressed to be less than the preset threshold. In accordance with an embodiment of the invention, the wireless power receiver may change the element value by a preset value. The wireless power receiver may then repeatedly change the element value by the preset value until the absolute value of the ripple is below the preset threshold.

If the absolute value of the ripple is less than the preset threshold, the wireless power receiver charges the wireless power in step S509.

Figure 6:
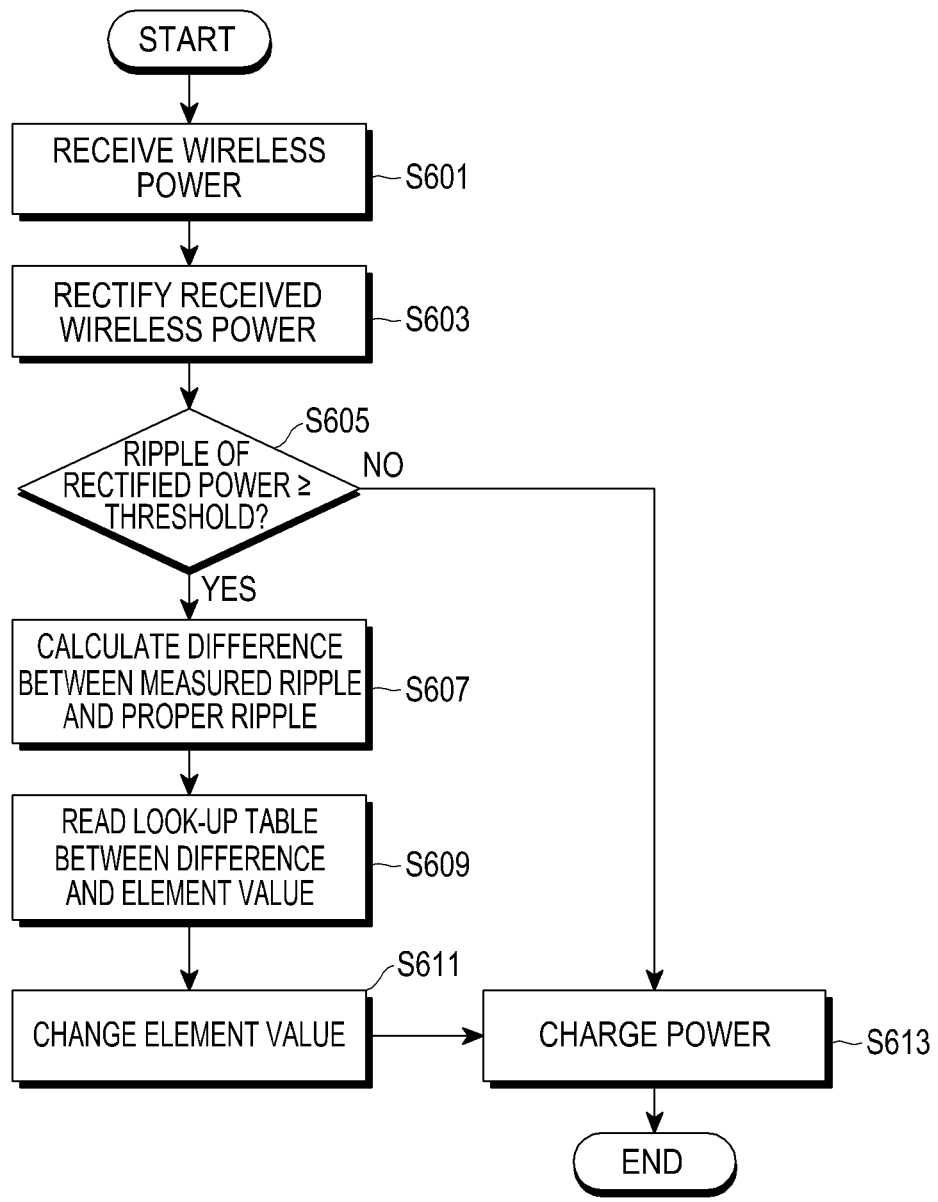
FIG. 6 is a flowchart illustrating a control method in a wireless power receiver according to another embodiment of the present invention.

FIG. 6 is a flowchart illustrating a control method in a wireless power receiver according to another embodiment of the present invention.

Referring to FIG. 6, the wireless power receiver receives wireless power from a wireless power transmitter in step S601.

The wireless power receiver rectifies the received wireless power and outputs the rectified DC wireless power in step S603.

In step S605, the wireless power receiver determines whether an absolute value of a ripple of the rectified wireless power is greater than or equal to a preset threshold. If the absolute value of the ripple is greater than or equal to the preset threshold, the wireless power receiver calculates a difference between an absolute value of the measured ripple and an absolute value of a proper ripple in step S607.

The wireless power receiver reads a look-up table for a relationship between the difference and a change in an element value corresponding thereto in step S609.

Table 1 is an example of a look-up table. based on the resistive load modulation scheme.

TABLE 1

| | Difference | | | | | | | |
|---|---|---|---|---|---|---|---|---|
| | 10 | 20 | 30 | 40 | 50 | 60 | 70 | 80 |
| Change in Resistive Element | 0.11 | 0.15 | 0.18 | 0.21 | 0.31 | 0.43 | 0.60 | 0.80 |

For example, if a difference between an absolute value of the ripple and an absolute value of the proper ripple is 10 mV, the wireless power receiver increases the resistive element by 0.11Ω, in step S611. Accordingly, the wireless power receiver suppresses the ripple below the threshold at one time, without repeatedly changing the element value.

If an absolute value of the ripple is less than the preset threshold, the wireless power receiver performs charging in step S613.

As is apparent from the foregoing description, the present invention provides a wireless power receiver and control method thereof, which are capable of suppressing ripple without additional components, such as a regulator.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A control method in a wireless power receiver that receives power from a wireless power transmitter, the method comprising:
 receiving the power from the wireless power transmitter wirelessly;
 rectifying the received power;
 modulating the rectified power by connecting one of a variable resistor and a variable capacitor of a modulator to a rectifier of the wireless power receiver or disconnecting one of the variable resistor and the variable capacitor of the modulator from the rectifier, wherein the variable resistor and the variable capacitor are disposed outside of a battery of the wireless power receiver;
 monitoring a voltage value of the rectified power while modulating the rectified power;
 determining whether a ripple of the voltage value of the rectified power is greater than or equal to a preset threshold; and
 if the ripple of the voltage value of the rectified power is greater than or equal to the preset threshold, changing one of a resistance of the variable resistor and a capacitance of the variable capacitor during the modulation of the rectified power in real time to suppress the ripple below the preset threshold and charging the battery by using the rectified power of which the ripple is suppressed,
 wherein the ripple is caused by the modulation of the rectified wireless power.

2. The control method of claim 1, further comprising outputting the rectified power in a form of Direct Current (DC).

3. The control method of claim 1, wherein the rectified power is modulated based on a resistive load modulation scheme.

4. The control method of claim 1, wherein the rectified power is modulated based on a capacitive load modulation scheme.

5. The control method of claim 1, wherein changing one of the resistance of the variable resistor and the capacitance of the variable capacitor comprises:
 calculating a difference between an absolute value of the ripple and an absolute value of a proper ripple;
 reading a look-up table for a relationship between the difference and one of a change in the resistance and a change in the capacitance, which corresponds to the difference; and
 changing one of the resistance of the variable resistor and the capacitance of the variable capacitor based on the read change in the resistance and the change in the capacitance.

6. A power receiver for receiving power from a wireless power transmitter, comprising:
 a power receiver configured to receive the power from the wireless power transmitter wirelessly;
 a rectifier configured to rectify the received power;
 a modulator comprising one of a variable resistor and a variable capacitor and configured to modulate the rectified power by connecting one of the variable resistor and the variable capacitor to the rectifier or disconnecting one of the variable resistor and the variable capacitor of the modulator from the rectifier;

a controller configured to:
monitor a voltage value of the rectified power while modulating the rectified power,
determine whether a ripple of the voltage value of the rectified power is greater than or equal to a preset threshold, and
if the ripple of the voltage value of the wireless power is greater than or equal to a preset threshold, control to change one of a resistance of the variable resistor and a capacitance of the variable capacitor during the modulation of the rectified power in real time to suppress the ripple below the preset threshold; and
a battery for charging by using the rectified power of which the ripple is suppressed, wherein the variable resistor and the variable capacitor are disposed outside of a battery of the wireless power receiver, and
wherein the ripple is caused by the modulation of the rectified power.

7. The wireless power receiver of claim 6, wherein the controller outputs the rectified power in a form of Direct Current (DC).

8. The wireless power receiver of claim 7, wherein the modulator comprises:
a first resistor having a first end connected to the rectifier and a second end connected to the controller;
a second resistor having a first end connected to the controller and the second end of the first resistor, and a second end connected to the rectifier;
the variable resistor having a first end connected to the first resistor and a second end connected to the controller; and
a switch having a first end connected to the second end of the variable resistor and a second end connected to the battery.

9. The wireless power receiver of claim 8, wherein the switch includes an N-channel Metal-Oxide-Semiconductor (N-MOS) element, a gate of which is connected to the controller.

10. The wireless power receiver of claim 6, wherein the modulator modulates the rectified power based on a resistive load modulation scheme.

11. The wireless power receiver of claim 6, wherein the modulator modulates the rectified power based on a capacitive load modulation.

12. The wireless power receiver of claim 6, further comprising a storage for storing a look-up table including a relationship between an absolute value of a proper ripple and one of a change in the resistance and a change in the capacitance that corresponds to a difference between absolute value of a ripple and the absolute value of the proper ripple,
wherein the controller calculates the difference between the absolute value of the ripple and the absolute value of the proper ripple, reads the look-up table for the relationship between the difference and one of the change in the resistance and the change in the capacitance, which corresponds to the difference, and changes one of the resistance of the variable resistor and the capacitance of the variable capacitor based on the read change in the resistance and the change in the capacitance.

* * * * *